(12) United States Patent
Bermudez-Cisneros

(10) Patent No.: US 10,665,238 B1
(45) Date of Patent: May 26, 2020

(54) ALERT THROUGH VOICE ASSISTANT

(71) Applicant: Capital One Services, LLC, McLean, VA (US)

(72) Inventor: Maria Bermudez-Cisneros, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/373,136

(22) Filed: Apr. 2, 2019

(51) Int. Cl.
| | | |
|---|---|---|
| *G10L 15/22* | (2006.01) | |
| *G10L 15/18* | (2013.01) | |
| *G06F 3/16* | (2006.01) | |
| *G06Q 40/02* | (2012.01) | |
| *G10L 17/00* | (2013.01) | |

(52) U.S. Cl.
CPC .............. *G10L 15/22* (2013.01); *G06F 3/167* (2013.01); *G06Q 40/02* (2013.01); *G10L 15/1822* (2013.01); *G10L 17/005* (2013.01); *G10L 2015/223* (2013.01)

(58) Field of Classification Search
CPC ... G10L 15/22; G10L 15/1822; G10L 17/005; G10L 2015/223; G06F 3/167; G06Q 40/02
See application file for complete search history.

(56) References Cited

U.S. PATENT DOCUMENTS

| | | | |
|---|---|---|---|
| 9,691,378 B1 | 6/2017 | Meyers et al. | |
| 10,062,384 B1* | 8/2018 | Sugiura | G10L 25/63 |
| 10,089,981 B1 | 10/2018 | Elangovan et al. | |
| 10,102,844 B1 | 10/2018 | Mois et al. | |
| 10,102,855 B1 | 10/2018 | Sindhwani | |
| 10,109,294 B1 | 10/2018 | Ayrapetian et al. | |
| 2013/0343534 A1* | 12/2013 | Nguyen | H04M 3/5191 379/265.09 |
| 2016/0232534 A1* | 8/2016 | Lacey | G06Q 20/38215 |
| 2018/0101568 A1* | 4/2018 | Jones-McFadden | G06Q 40/02 |
| 2018/0130321 A1* | 5/2018 | Brayton | G08B 7/06 |
| 2018/0342121 A1* | 11/2018 | Borgmeyer | G06Q 20/401 |
| 2019/0103111 A1* | 4/2019 | Tiwari | G10L 15/22 |

OTHER PUBLICATIONS

Southeast Financial Credit Union, "Try these 6 tips to avoid overdraft fees," Feb. 6, 2018 (available at https://www.southeastfinancial.org/news/try-these-6-tips-to-avoid-overdraft-fees, last accessed Jun. 21, 2019). (Year: 2018).*

(Continued)

*Primary Examiner* — Michelle M Koeth

(57) ABSTRACT

A system and method of issuing an alert through a voice assistant on behalf of a bank or other financial institution is disclosed. The alert through voice assistant enhances the channels of communication between the financial institution and the customer and enables a variety of information to be provided to the customer, including, but not limited to, fraud alerts. The alert through voice assistant satisfies two of the three security indicia, thus increasing the likelihood that the financial institution is in communication with its customer rather than a fraudster. The alert through voice assistant provides a mechanism in which information provided to the customer is clear, detailed, and interactive, increasing customer satisfaction and decreasing superfluous customer service calls.

19 Claims, 12 Drawing Sheets

(56) References Cited

OTHER PUBLICATIONS

Southeast Financial Credit Union, "Contact Us," Jun. 22, 2019 (available at https://www.southeastfinancial.org/about/contact-us, last accessed Jun. 22, 2019). (Year: 2019).*

Kumar, D., et al., "Skill Squatting Attacks on Amazon Alexa", Proceedings of the 27th USENIX Security Symposium, Aug. 15-17, 2018, pp. 16, USENIX Association, Baltimore, Maryland. https://www.usenix.org/conference/usenixsecurity18/presentation/kumar.

Holden, T., "Making your devices speak: Integration between Amazon Alexa and the Managed IoT Cloud." Unpublished master's thesis, Jun. 2018, pp. 76, The Arctic University of Norway. http://github.com/egraff/uit-thesis.

* cited by examiner

900

ALERT THROUGH VOICE ASSISTANT

BACKGROUND

Smart speakers, also known as smart home voice-activated assistants, or voice assistants, are music speakers combined with a voice recognition component. Activated by a "wake-up word", a user can subsequently ask questions, make requests, invoke notifications, and more. A recording of the request is sent to a backend, such as one or more cloud servers, for analysis. Voice biometrics and natural language understanding (NLU) are used to decipher the questions/requests.

The applications for voice-activated assistants are expanding. For the home user, obtaining weather reports, playing music, setting timers, and reciting recipe instructions are among the applications fulfilled in response to a user request. Voice-activated assistants are also being used outside the home.

BRIEF DESCRIPTION OF THE DRAWINGS

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

DETAILED DESCRIPTION

Figure 1:
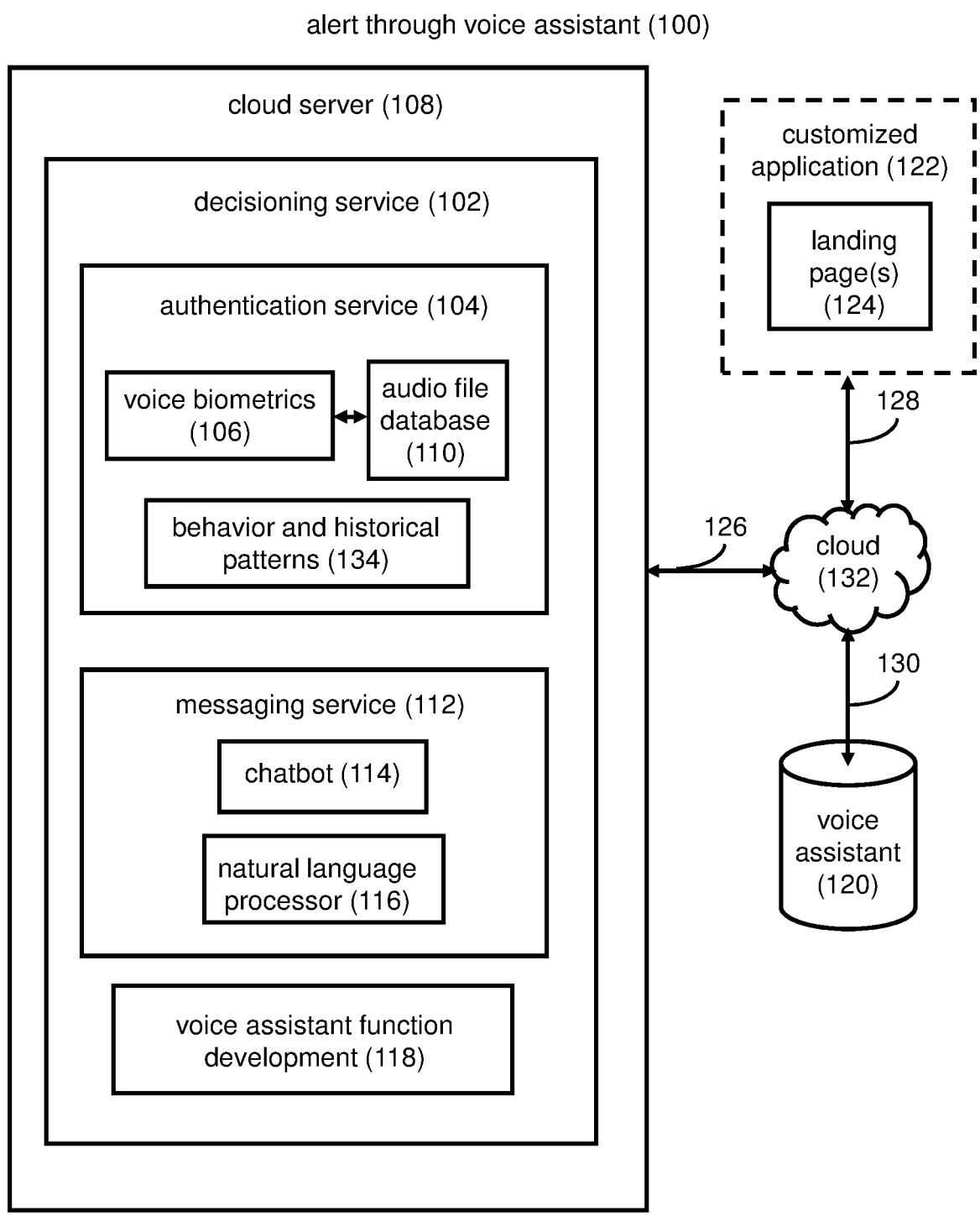
FIG. 1 is a simplified block diagram of an alert through voice assistant, according to some embodiments.

Embodiments described herein provide a system and method of issuing an alert through a voice assistant for a bank or other financial institution. The alert through voice assistant enhances the channels of communication between the financial institution and the customer and enables a variety of information to be provided to the customer, including, but not limited to, fraud alerts. The alert through voice assistant satisfies two of the three security indicia, thus increasing the likelihood that the financial institution is in communication with its customer rather than a fraudster. The alert through voice assistant provides a mechanism in which information provided to the customer is clear, detailed, and interactive, increasing customer satisfaction and decreasing superfluous customer service calls.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to the desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

A method and system for providing an alert through voice assistant are described with respect to FIGS. 1-11, below. Before describing the alert through voice assistant in detail, an overview of the state of the art is provided.

Evolution of the Banking Relationship

Banks and other financial institutions provide a number of different services involving finances, most notably, a checking or savings account. Hereinafter, a reference to a "bank" is meant to encompass other financial institutions, including, but not limited to credit unions, savings and loan institutions, and financial service providers, such as credit card companies, brokers, mortgagors, investment funds, and so forth. Initially, a customer of a bank would rely on a passbook, a booklet issued by the bank, enabling the accountholder to personally record how much money had been deposited or withdrawn from the account. More recently, an accountholder would receive a statement, usually monthly, in the mail.

With the advent of personal computers, banks began providing account statements by electronic mail for those users who selected the feature, such as being part of the institution's "paperless" option. Today, many banks enable customers to access their account information by way of a personal computer, laptop, tablet, notebook, pad, personal digital assistant, or other device that has access to the Internet. From a web page in which a username and password is provided as authentication, the user is able to receive a wealth of information about the bank account, including recent purchases and deposits, transaction entities, bank statements, and so on. These web accesses also enable transactions to take place, known colloquially as "online banking" in which automatic payments may be scheduled and money may be transferred between different accounts of the user, to a third-party account within the same bank, and even to a third-party account with another bank. Relying on this Internet-based access, today's accountholder may view the current balance of an account twenty-four hours a day, seven days a week.

With the proliferation of hand-held device technology, such as smart phones, many banks have made applications (known colloquially as "apps") available to their customers. As long as the smartphone is able to access the Internet, the bank may provide a downloadable app for accessing a customer's bank account from the smartphone. Similar to the web page, the app, once selected, will generally request a username and password to authenticate the user. Alternatively, some apps enable access using a fingerprint or voiceprint to authenticate the user. Once authenticated, the user is able to review the account, such as to obtain balance information, scroll through transactions, make transfers to another account, deposit checks, and so on. These apps are intended to enhance the convenience for the accountholder. So, in addition to being able to access one's checking account by accessing a web page, a user may similarly access the account by enabling the app on a smartphone.

Alert Through Voice Assistant

FIG. 1 is a simplified block diagram of an alert through voice assistant 100, according to some embodiments. The alert through voice assistant 100 includes a decisioning service 102, a voice assistant 120, and, alternatively, a customized application 122. The decisioning service 102 is a software program stored on a cloud server 108 that is connected to the voice assistant by way of a cloud service or cloud 132. The decisioning service 102 is part of the bank, the voice assistant 120 is located in a bank customer's home or office, and the customized application 122 is available on the customer's hand-held device. A bank customer may also be referred to herein as a customer, a user, a person, and an accountholder.

In addition to the mechanisms used by banks described above, the voice assistant 120 offers another channel in the bank's relationship with the account holder, in some embodiments, as described in more detail herein. Voice assistants 120 are speaker-based devices found in user's home or office which are voice-activated. The voice assistants 120 operate by way of functions or events that are operable upon a voice assistant platform, some of the functions are automatically available upon setup and others explicitly added by the user. These functions are analogous to apps on a hand-held device and enable the voice assistant to perform some task vocally. Amazon's Echo, for example, uses Amazon Alexa as the platform in which new functions can be built using the Alexa Skills Kit. The voice assistant 120 is described in more detail below.

The alert through voice assistant 100 of FIG. 1 works by way of a connection 126 between the voice assistant 120 and the decisioning service 102 of the bank. In some embodiments, the decisioning service 102 is part of a cloud server 108. A server in an office provides security, control, and performance for that office. A cloud server similarly provides security, control, and performance, but, although it may be physically disposed in the office, the cloud server also may physically reside elsewhere, in a virtualized environment that is managed by the cloud service. Where the customized application 122 is available, a connection 128 to the cloud 132 provides enhanced capability of the alert through voice assistant 100, in some embodiments. In some embodiments, connections 126, 128, and 130 are wireless connections to the cloud 132.

The decisioning service 102 includes an authentication service 104, messaging service 112, and voice assistant function development 118, in some embodiments. The authentication service 104 authenticates the customer of the bank. Because the interaction by the customer with the voice assistant 120 is by way of the customer's voice, the authentication service 104 includes voice biometrics 106. Biometrics is the physical characteristic unique to an individual Like a fingerprint, a person's vocal characteristics, are also unique for each individual. The voice biometrics 106 of the authentication service 102 thus consists of identifying the voice characteristic of the accountholder.

In some embodiments, the authentication service 104 further includes an audio file database 110. This is a database of audio interactions with the customer, such as when the customer calls the bank. Use of the voice assistant 120 by the customer can also be added to the audio file database.

The decisioning service 102 also includes a messaging service 112. The messaging service 112 determines what message is to be relayed to the bank customer, as described in more detail below. In some embodiments, the messaging service 112 includes a chatbot 114 and a natural language processor 116. The chatbot 114 is a generic term for a computer program or artificial intelligence that engages in a conversation via voice or text. Chatbots are also known as smartbots, talkbots, and so on. The chatbot 114 analyzes audio or text of the customer and figures out how to answer questions dynamically. The chatbot is accessed via the virtual assistant 120 via the messaging service 112. The natural language processor 116 is another computer program in which the spoken word of the customer is interpreted to determine how to respond. Users may call a customer service phone number in which chatbots employing natural language processing, route calls and answer questions, sometimes in conjunction with actual humans, but sometimes instead of human interaction.

In addition to information obtained by analysis of the bank customer's voice, behavior and historical patterns 134 of the customer are also analyzed by the authentication service 104, in some embodiments. Confirming that the IP address of the voice assistant 120 is the same as that of the bank customer's computer when accessing the bank web page is one example of a behavior and historical pattern. Or, geolocation of the mobile device used during online banking and confirming this as being the bank customer's home address is another example of such patterns. In addition to these location-based analyses, patterns of the bank customer, such as when the customer typically accesses the bank's web page within a certain time frame, is the type of indicia that enhances the ability of the decisioning service to authenticate the user, in some embodiments.

The behavior and historical patterns 134 may be used in lieu of the voice printing, in some circumstances. The more information known to the bank, the more likely the authentication will be successful, in some embodiments. Success is measured by whether the bank customer is actually the individual who established the relationship with the bank, rather than a fraudster.

In some embodiments, the decisioning service 102 of the bank also includes voice assistant function development 118. The bank may have developed a function for providing an account balance to the customer, a second function for a fraud alert, and so on. Or, these features may be part of the same function. The function operates on the platform of the voice assistant (e.g., Amazon skills on Amazon Alexa). As banking services expand, ongoing function development is part of the decisioning service 102.

The customized application 122 is an optional feature of the alert through voice assistant 100, in some embodiments. Where available, the customized application 122, or app, is part of the customer's hand-held device, such as a smartphone. During a customer interaction, for example, the voice assistant 120 may direct the customer to the app 122 on the smartphone for further information. Accordingly, the app 122 is enhanced with one or more landing pages 124, or screens, that provide additional information about the alert provided through the voice assistant 120.

Figure 2:
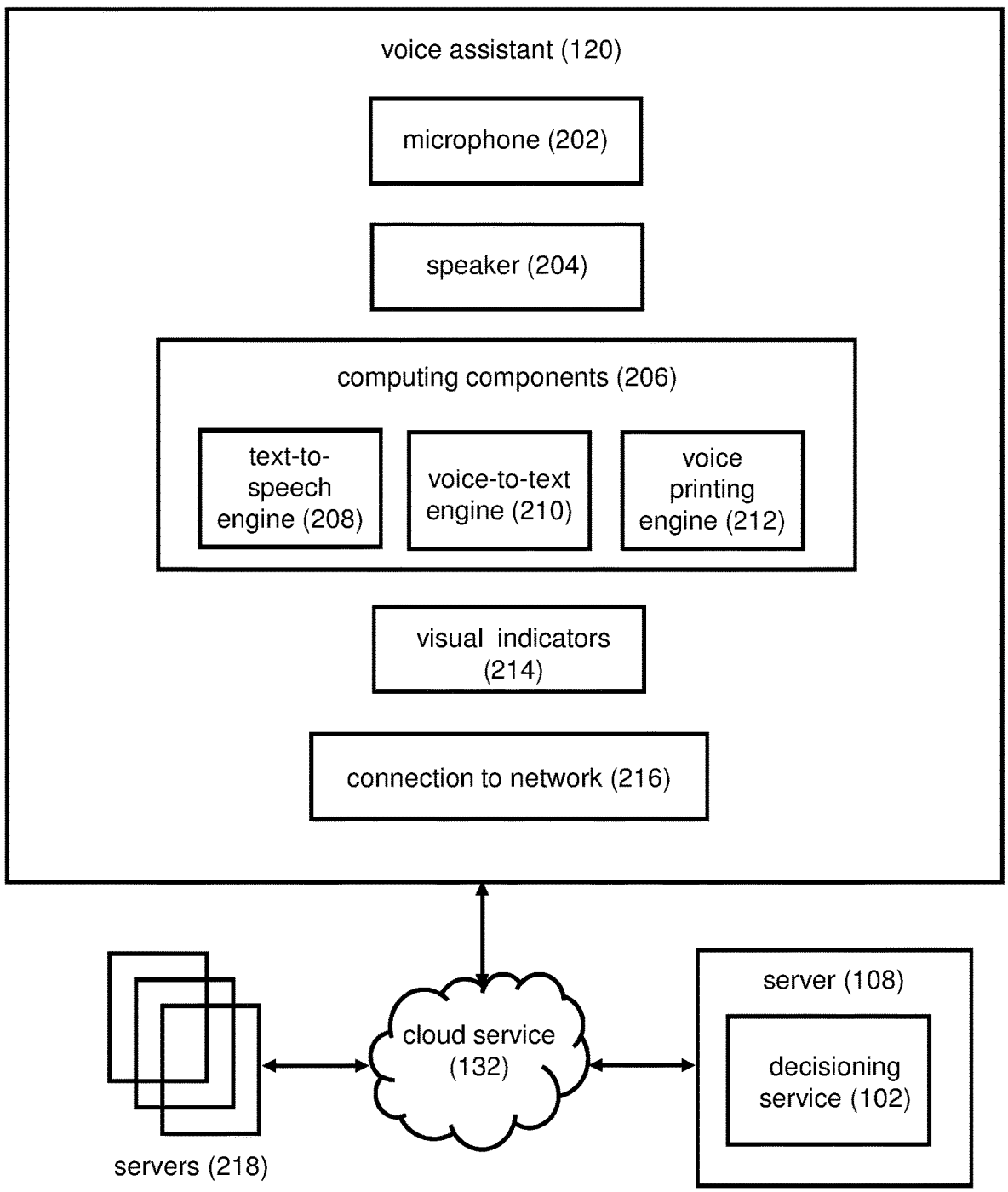
FIG. 2 is a simplified illustration of the voice assistant of FIG. 1, according to some embodiments.

FIG. 2 is a simplified illustration of an environment 200 of the voice assistant 120 of FIG. 1, according to some embodiments. Voice assistants are currently available from a number of vendors, not all of which include all features illustrated in FIG. 2. Windows has a voice assistant embedded in its operating system known as Cortana. Apple has a voice assistant to be used with its smartphones known as Siri. Amazon markets a voice assistant known as Echo, activated by the activation word, "Alexa", "Computer", or "Echo". Google markets a voice assistant called Google Home which is activated by saying "OK Google" or "Hey Google". Although many of the features may also be found in Windows and Apple voice assistants, the illustration 200 of FIG. 2 is meant to describe the voice assistants which share one or more features of Amazon's Echo device or Google's OK Google device, that is, a free-standing device that is decoupled from another device, such as a laptop computer or a smartphone.

The voice assistant 120 features a microphone 202, a speaker 204, computing components 206, visual indicators 214, such as lights, and a connection to a network 216, such as the cloud service 132. The voice assistant 120 may have other features not shown, such as a camera or a display. The voice assistant 120 couples to the cloud service 132, which enables communication with the cloud server 108, enabling the decisioning service 102 stored on the server 108 to process the functions of the voice assistant. Additional servers 218 may be available to process other non-banking functions, such as providing weather reports, playing music, or providing news reports, as examples. Functions (e.g., Alexa skills) developed by the voice assistant function development 118 of the decisioning service 102 (FIG. 1) may provide one or more alert through voice assistant capabilities, as described in more detail below.

Among other features not shown, the computing components 206 of the voice assistant 120 include a text-to-speech engine 208, a voice-to-text engine 210, and a voice printing engine 212. The text-to-speech engine 208 converts text to speech and the voice-to-text engine 210 converts speech to text. Thus, upon receiving a request from the user, such as, "What's the temperature outside?", the voice-to-text engine 210 converts the user's voice to text and the text is sent to the cloud service 132 for analysis. A weather function provides an answer in text form, the text is sent back to the voice assistant 120, and the text-to-speech engine 208 converts the text back to a voice, such that the voice assistant answers, "it's 68 degrees outside". In this example, one of the servers 218 rather than the server 108 would process the weather-related inquiry.

In some embodiments, the voice printing engine 212 is a mechanism by which the voice assistant 120 verifies the user's voice, prior to any functions being implemented. For general questions like asking about the weather, the voice printing engine 212 may not be invoked. But, for functions that are to be authenticated, such as an interaction with a bank, voice printing is one of the mechanisms by which the user's identity is verified.

The computing components 206 of the voice assistant 120 may work in conjunction with the authentication service 104 and/or the messaging service 112 (FIG. 1). One or more of the computing components 206 may reside, not within the voice assistant 120, but in the cloud servers. System designers of ordinary skill in the art recognize a number of different ways in which these features may be made available to the voice assistant.

Figure 3:
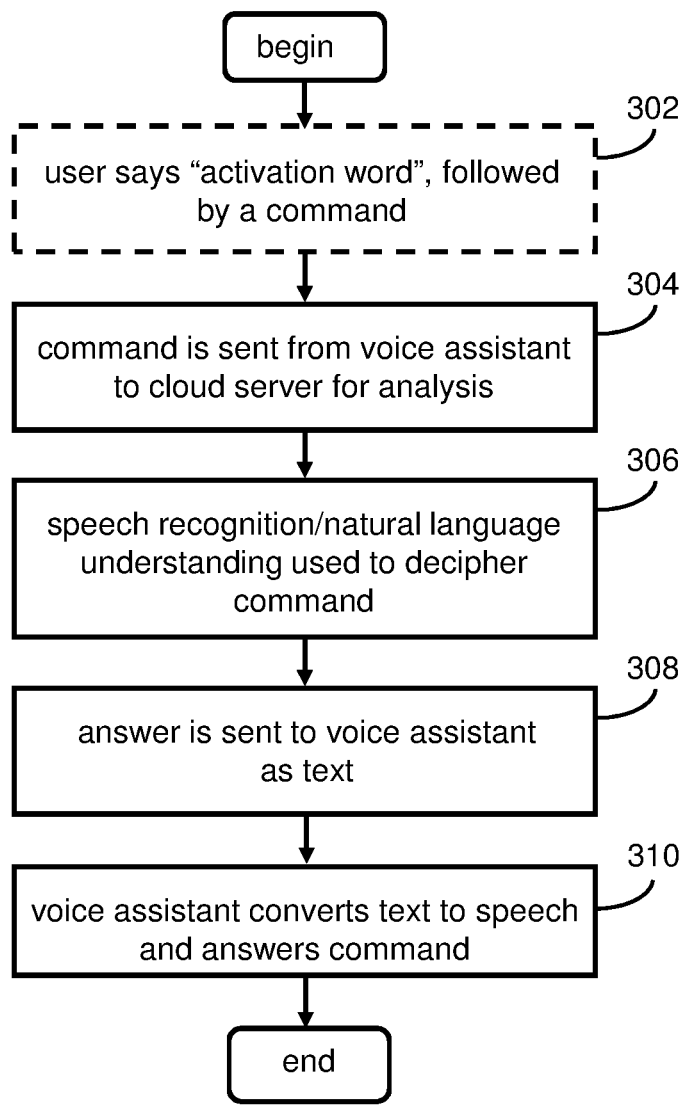
FIG. 3 is a flow diagram illustrating possible operation of a voice assistant by a user in response to an activation word, according to some embodiments.

FIG. 3 is a flow diagram illustrating possible operations 300 of the voice assistant by a user, according to some embodiments. The first operation 302 is shown as optional (dashed lines) because some interactions between the voice assistant and the user may occur without using an activation word. Optionally, the user, which may be the bank customer or accountholder, says an activation word, such as Alexa or OK Google, followed by a command, such as, "Tell me the news" (block 302). The command, which may first be converted by the voice-to-text engine from audio to text, is sent to the appropriate cloud server for analysis (block 304). Natural language processing is used to decipher the command (block 306), after which an answer is sent to the voice assistant as text (block 308). The voice assistant, which may use the text-to-speech engine to convert the text to an audio voice, answers the command, e.g., "In today's news, the president announced plans to . . . " (block 310). In this example, a news function is responsive to the user saying the word, "news", and the voice assistant provides a vocalization of current information about what is going on in the world.

Figure 4:
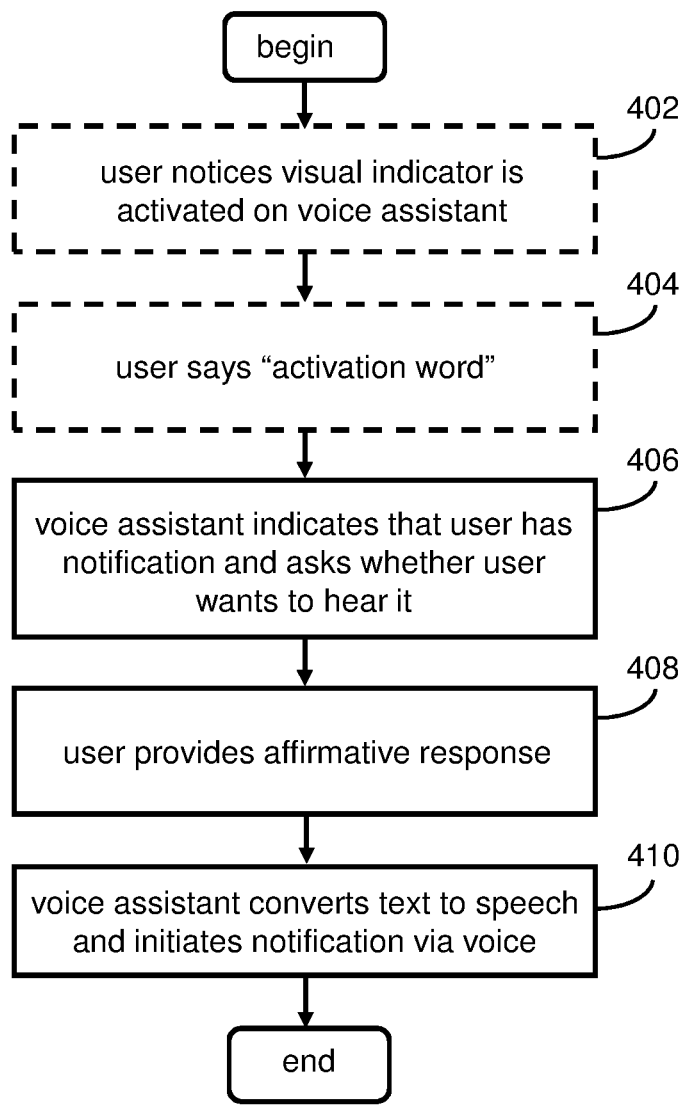
FIG. 4 is a second flow diagram illustrating possible operation of the voice assistant by a user when notifications are activated, according to some embodiments.

FIG. 4 is a second flow diagram illustrating possible operations 400 of the voice assistant by a user, according to some embodiments. Again, some of the operations are optional (dashed lines). In FIG. 3, the activation of the voice assistant is in response to the activation word being spoken by the user. In this example, by contrast, in this example, a type of function in which notifications occur is activated. Amazon's Echo, for example, has a skill called "Notify Me", as one example of this function. Thus, the user is, in essence, prompted by the voice assistant to engage rather than the user initiating the interaction with the voice assistant.

In this example, the user notices the visual indicator of the voice assistant. The visual indicator may be a light, and the light may be flashing, is lit, or is displaying a different color than when the voice assistant is dormant. Thus, the visual indicator may be anything that makes the voice assistant look different than when dormant, thus "notifying" the user that a notification is to be received. Thus, the user notices the visual indicator is activated on the voice assistant (block 402). The user says the activation word (block 404).

Alternatively, the operations 400 may begin with operation 406, such as when the user has activated automatic notifications. The voice assistant lets the user know that there is a notification and asks the user whether to provide the notification (block 406) and the user indications affirmatively (block 408). The notification, originally made available to the voice assistant via text, is converted to speech and the notification is provided verbally by the voice assistant (block 410).

Figure 5:
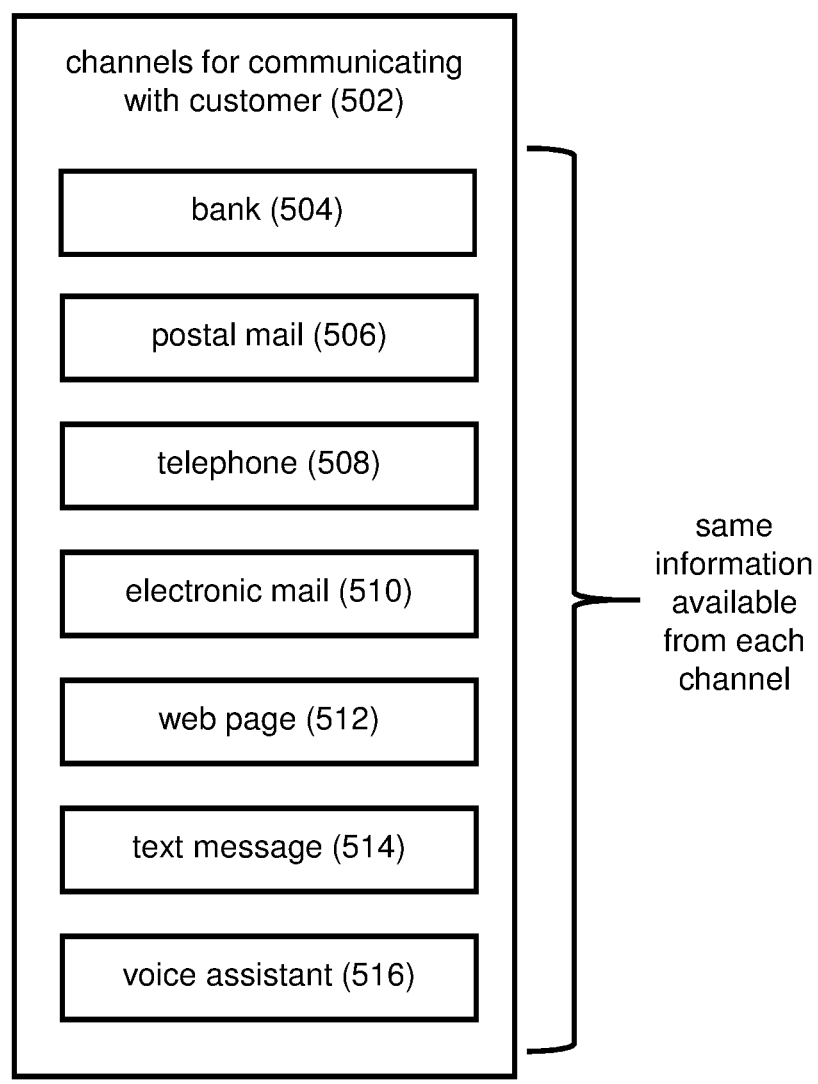
FIG. 5 is a simplified illustration of the communication channels available to the bank for reaching its customers, according to some embodiments

Banks increasingly utilize multiple mechanisms to communicate with its accountholders. The communication mechanisms are known herein as channels or communication channels. FIG. 5 is a simplified illustration 500 of the communication channels 502 available to the bank for reaching its customers, according to some embodiments, including the voice assistant channel first introduced in FIG. 1. In addition to being able to go directly and physically to one's bank 504, the bank and accountholder can interact via postal mail 506. The bank can call the customer on a telephone number 508 associated with the customer account (if the customer has a phone) and the accountholder can call the bank. For those customers with computer access, the bank can send a message to the accountholder by way of electronic mail (email) 510) and often provides an email address with which the accountholder can contact the bank. Or, the bank can communicate with the user when logging into the account on the web 512 and the user can perform many transactions related to the account via the web. For customers with mobile phones, smart phones, tablets, or other hand-held devices in which Short Message Service (SMS) transmissions are possible, the bank can also send a message via text message 514 to the accountholder's mobile device. Finally, in some embodiments, the bank can communicate with the accountholder via voice assistant 516.

There are some limitations to these communication channels 502. Some accountholders may not be living in the country, making mail delivery 506 difficult. Other accountholders may not have a telephone, making telephone 508 and text message 514 interaction impossible. Still other accountholders may not have access to the Internet, rendering electronic mail 510, web page 512, and voice assistant 516 interaction unavailable. Sometimes, the law is an impediment to interaction with the accountholder. The Telephone Consumer Protection Act (TCPA), for example, disallows automated messages to be sent via text without the accountholder's explicit consent. While a possible fraudulent transaction may be an exception to the explicit consent rule, not all fraud fits into the exception. To provide optimum customer service, more communication channels 502 are preferred by the bank. Ideally, each channel of communication provides the same information to the customer. A call to the customer service line of the bank that provides information that conflicts with what the customer sees on a web page, for example, would undermine the trust the accountholder has in the bank. Thus, the bank coordinates these communication channels such that the same information is provided, whatever the mechanism by which the customer interacts with the bank or the bank interacts with the customer.

Figure 6:
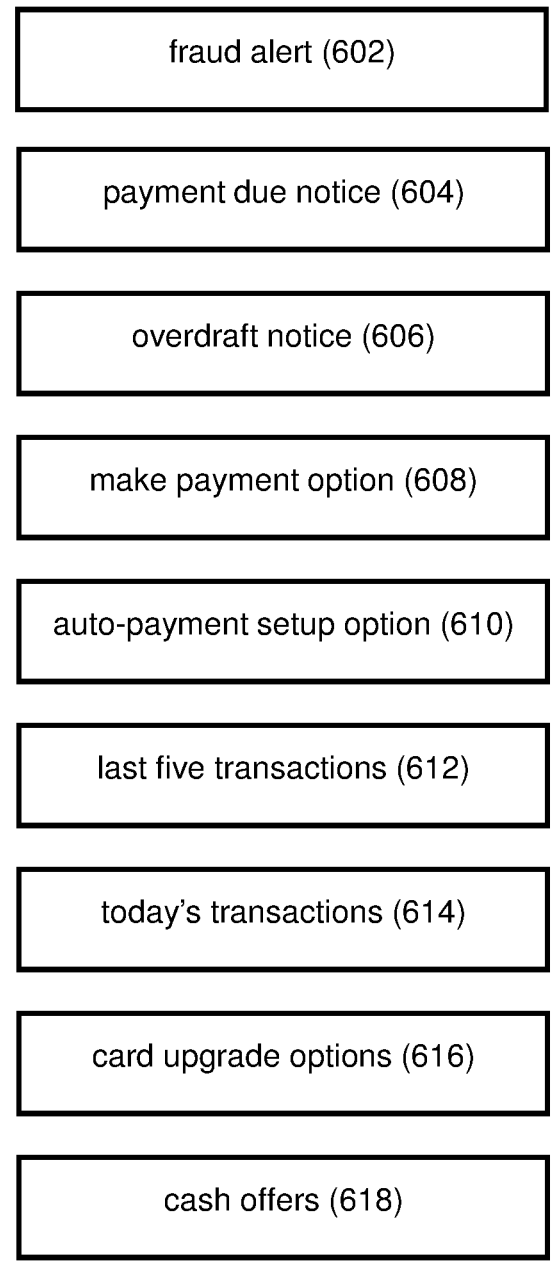
FIG. 6 is a simplified diagram illustrating some of the features that may be offered by a bank to its accountholders, according to some embodiments.

FIG. 6 is a simplified diagram 600 illustrating some of the features that may be offered by a bank to its accountholders using the alert through voiced assistant 100 of FIG. 1, according to some embodiments. Some of these features 600 are appropriate to a bank account such as a checking or savings account while others may be appropriate for a credit card account. The bank may be concerned that the account is being fraudulently used and may provide a fraud alert 602 to its accountholder. Additionally, a payment due notice 604 or an overdraft notice 606 may be provided. A make payment option 608 or an auto-payment setup option 610 may be presented to the customer. The last five transactions 612 or today's transactions 614 of the account may be made available to the accountholder. Card upgrade options 616 and cash offers 618 may also be provided. The list 600 is not exhaustive, but illustrative of the many ways in which banks, including credit card companies, may communicate with customers about accounts held by the bank. The one or more channels in FIG. 5 may be utilized in support of providing this information.

Among other interactions with its accountholders, some banks offer interactive fraud alerts to safeguards a user's bank account. What is perceived by the bank as a fraudulent transaction triggers the initial alert. Thus, if the bank's system detects suspicious activity on the bank account, the accountholder is sent a text message (or an automated voice message on the user's landline), which details the alleged fraud. For valid transactions, the user is able to confirm the transaction without further interaction. If the transaction is not valid, the user can so indicate, and a follow-up text message may be sent with a phone number to call for further action.

Figure 7:
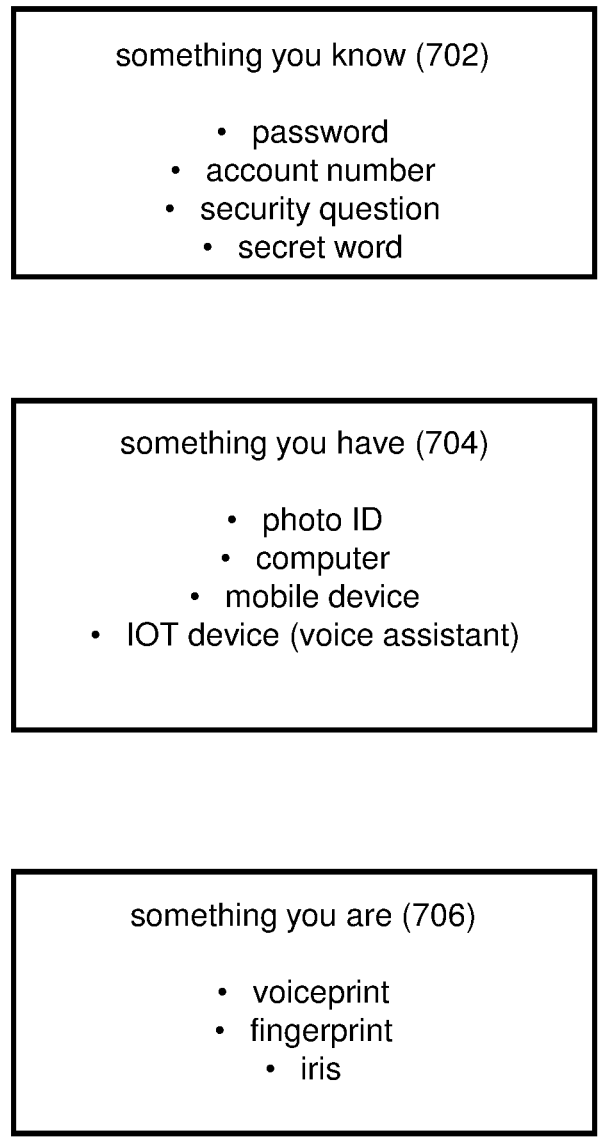
FIG. 7 is a simplified diagram illustrating three security factors used in fraud detection, according to some embodiments.

The alert through voice assistant 100 of FIG. 1 is advantageous over other channels of accountholder contact, in some embodiments. FIG. 7 is a simplified diagram illustrating three security factors used in fraud detection, in some embodiments: something you know 702, something you have 704, and something you are 706. Examples are given for each of these factors, although there may be more or fewer, depending on the accountholder. The something you know factors 702 may include a password, an account number, a security question, a secret word, and so on. Although the factors 702 are considered information available only to the accountholder, this information may be ascertained by a nefarious third party, such as where the accountholder writes a password down in an unsecure location, uses the same password for several different web sites, one of them unsecure, responds unknowingly to phishing emails or texts, or where the accountholder's family history is ascertainable, e.g., security question is, what is your mother's maiden name?, and so on.

The something you have factor 704 involves things, usually devices, that are in possession and control of the accountholder, such as a photo ID, a computer, a mobile device, and an Internet of Things (TOT) device, such as a voice assistant. Although these things are closely tied to the accountholder, they are not entirely failsafe. A photo ID may be counterfeited, a computer used in a public place may not be secure, and a mobile device may be stolen, as examples. The voice assistant, which generally resides in the accountholder's home or office, generally does not move from place to place, and therefore may be more secure than the other something you have factors.

The something you are factor 706 is tied directly to the accountholder. A person's fingerprint or iris scan is regarded as unique, and so is a voice print. Although it generally takes a few seconds of voice dialogue to uniquely identify a person's voice, the voiceprint is regarded as a good identifier, in some embodiments.

In some embodiments, the alert through voice assistant 100 is advantageous over the other channels of communication indicated in FIG. 5. Under IoT, the voice assistant is associated with the user who performed the initial setup. The voice assistant has an associated Internet Protocol (IP) address, which also ties the voice assistant to the user. When a voice assistant function is set up, there is an IoT identification for that device, and the voice assistant is thereafter associated with that user. The voice assistant is thus, in essence, a type of device printing, associating the user with the device.

Further, the voice assistant does voice printing as part of its verification procedure. Although the voice assistant may allow anyone in the household to ask about the weather, some of the functions of the voice assistant may be set up so that one member of the household, rather than any member, can invoke the function. For more secure functions, such as one provided by a bank, the voice print enables the function to be performed. Thus, in some embodiments, the alert through voice assistant 100 boosts the trust of the accountholder in the interaction with the voice assistant, relative to other channels of communication with the bank, through both the voice printing and the device printing provided by the voice assistant.

Thus, as a method of enhanced or stepped-up verification, using the alert through voice assistant 100, a bank can initiate a two-way conversation with a customer through a voice message delivered through a voice assistant. The bank would ask the customer a pertinent question using natural language and the customer's response, which is processed using natural language, in some embodiments, may be verified through voice biometrics (voice recognition) to maximize trust in the interaction and minimize customer friction.

The conversation between bank and accountholder may be iterative. Instead of simply getting a "yes" or "no" answer, the customer may request additional information/context before responding to the voice assistant, with the goal of solving customer concerns in the moment, without needing additional follow-ups through the other channels (FIG. 5).

Figure 8:
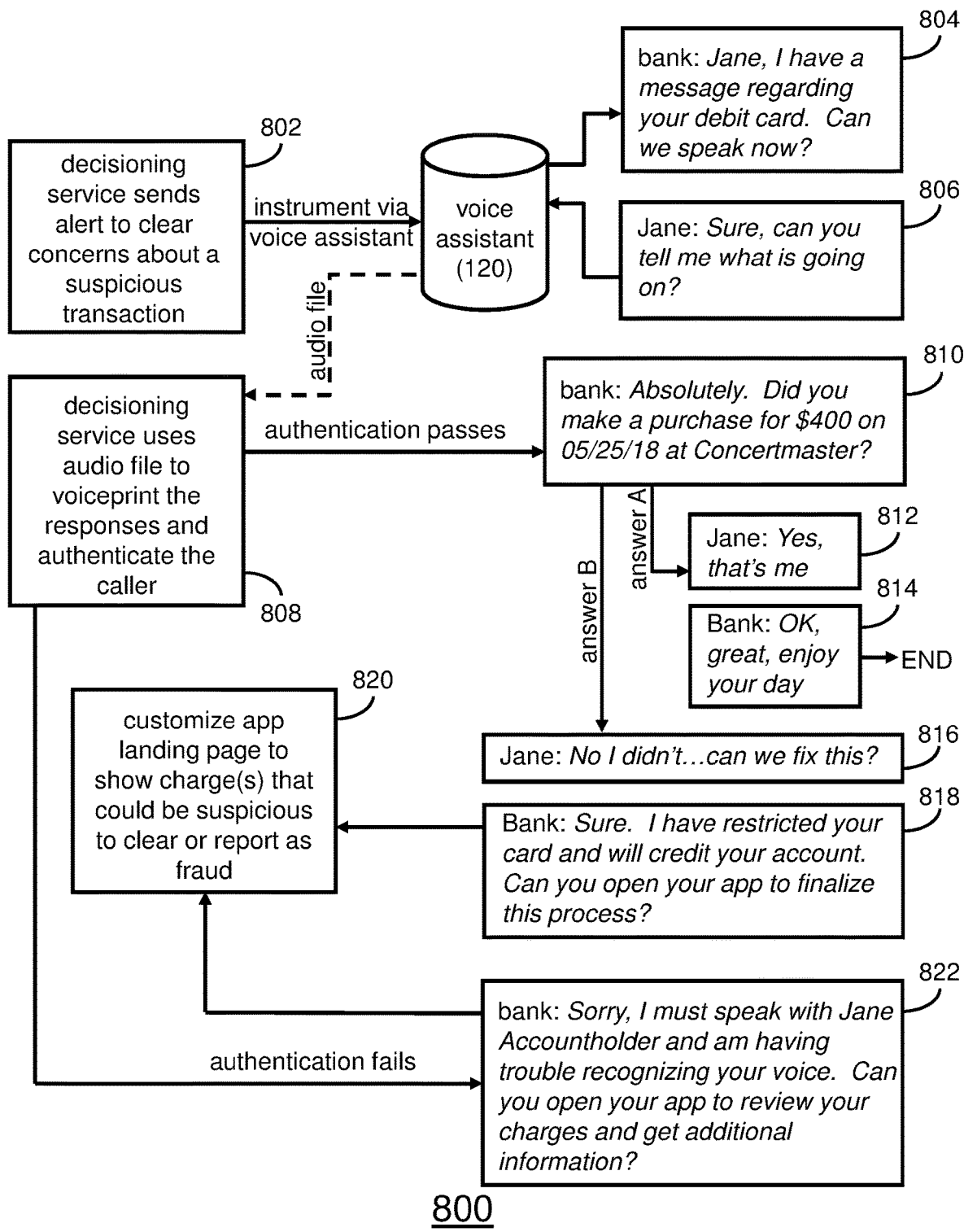
FIG. 8 is a schematic diagram showing an example dialogue between an accountholder and a bank, using the alert through voice assistant of FIG. 1, according to some embodiments.

FIG. 8 is a schematic diagram showing an example dialogue between an accountholder and a bank, using the alert through voice assistant of FIG. 1, in some embodiments. In the example dialogue, the decisioning service is part of a cloud server controlled by a bank such as in FIG. 1 and is attempting to notify the accountholder of a potential fraud situation with their account. Further, it is assumed that the accountholder is in the vicinity of a voice assistant, such as in a home or office, and the voice assistant is affiliated with the accountholder, such as being IoT-associated, as described in FIG. 7.

Based on concerns about a fraudulent transaction, the decisioning service sends an alert to the accountholder via the voice assistant (block 802). This may be regarded as a two-way alert because interaction with the accountholder is desired. In conjunction with the alert via voice assistant, the bank may simultaneously do one or more of the following: send a text message to the accountholder's phone, post a message on the accountholder's web page, send an automated message to the accountholder's landline phone, and send a message to the accountholder's email address. The voice assistant initiates a notification to the accountholder verbally: "Jane, I have a message regarding your debit card. Can we speak now?" In this example, the accountholder has activated notifications from the voice assistant, such that the voice assistant is calling out to the accountholder unprompted. In another example, the bank may send a message via text, asking the accountholder to converse with the voice assistant. In this example, the accountholder, Jane, replies, "Sure, can you tell me what is going on?"

At this point, an audio file of Jane's voice is converted to text, as described above, and sent to the decisioning service on the cloud server of the bank. In another example, the audio of Jane's voice may be sent to the cloud server of the bank, saved as part of the accountholder's audio file database 110 (FIG. 1), and then converted to text for analysis. The decisioning service uses the audio file to voiceprint Jane's response and authenticate her (block 808). As illustrated in FIG. 1, the authentication service 104 of the decisioning service 102 may utilize voice biometrics 106 to verify the voice as Jane's. This is distinguishable from what is available to the bank when sending a text message or an electronic mail message, as the bank would be unable to ascertain whether Jane is the actual individual replying to either.

If the authentication passes, the bank, by way of the voice assistant, is able to reply to Jane: "Absolutely. Did you make a purchase for $400 on May 25, 2018 at Concertmaster?" (block 810). If Jane replies, "Yes, that's me" (block 812), then the bank is receiving verification from the accountholder that the transaction is legitimate, and no fraud has taken place. The voice assistant replies, "OK, great, enjoy your day" and no further action is taken (block 814). If, on the other hand, Jane is unfamiliar with the transaction, and she replies something like, "No, I didn't . . . can we fix this?" (block 816), this is an opportunity for the bank to assure the accountholder that the problem is being addressed by the bank (block 818). In this example, the bank sends the accountholder to an application on the accountholder's phone to complete the process of addressing the fraudulent transaction. In another example, the bank may ask the accountholder to log into their website to address the fraudulent transaction. As a last resort, the accountholder may be invited to call the bank to speak with a person about addressing the fraudulent transaction.

It is possible that accountholder Jane may give an answer other than yes (block 812) or no (block 814). The natural language processing 116 of the messaging service 112 in the decisioning service of the bank (FIG. 1) is able to address answers other than the ones given in the example of FIG. 8. The messaging service 112, using the chatbot 114, is able to figure out an appropriate follow-up question to extract an answer that is useful from the accountholder.

It is also possible that, where the accountholder's answer is uncertain, the bank can give more information about the transaction to the user. For example, by way of the voice assistant, the bank can tell Jane, "May 25, 2018 was a Wednesday", "The purchase was for two tickets to the opera", "Concertmaster is located at ABC Mall", or "if you go to your app, you will see a detailed invoice of the transaction". This clarifying information may be enough for the accountholder to recall the transaction as legitimate.

Where the bank prompts Jane to access her smartphone app, a customized app landing page, e.g., landing page 124 in FIG. 1, is made available to show the suspicious charge, enabling the accountholder to confirm as legitimate or report as fraud from her phone (block 820). This is an example where two of the many channels available to the bank for interacting with the accountholder are utilized to resolve a possible fraudulent transaction, and are available automatically, without having to interact with a person at the bank.

Where the authentication (block 808) fails, the bank so notifies the user (block 822). This could happen if someone else in Jane's household, such as Jane's husband, answers the voice assistant. Jane's voiceprint is one of the security factors upon which the bank relies in using the voice assistant. In this example, the accountholder is again invited to access the bank's app on the mobile device to further process the possible fraudulent transaction.

Figure 9:
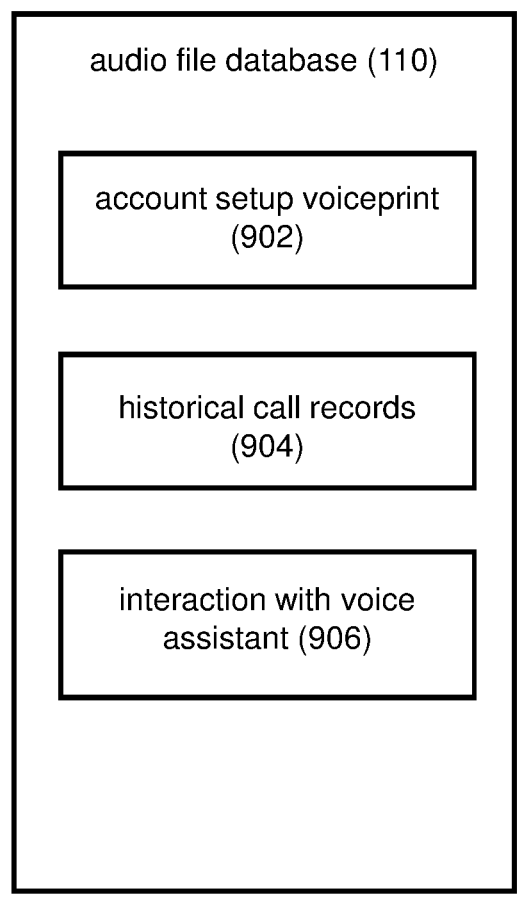
FIG. 9 is a simplified illustration audio file database update, according to some embodiments.

The audio file database 110 enables the bank to authenticate the user during the voice assistant interaction, such as the scenario of FIG. 8. FIG. 9 provides simplified illustration of some ways in which the audio file database 110 may be updated based on interactions with the accountholder, according to some embodiments. The bank may have a practice in which the new accountholder speaks into a voice recording upon opening the account (block 902). The bank may also record all incoming calls from accountholders and store those recordings in the database (block 904). In addition to voice-printing the accountholder, the recordings may be converted to text for analytics purposes. The banks may, for example, scan the texts of voiceprints for keywords so as to determine the most common reasons people are contacting the bank. The bank may also store voice recordings during interaction with the voice assistant (block 906). This list is not exhaustive, and, as voice assistants become a regular part of a bank's interaction with its accountholders, the bank may expand the mechanisms by which voice printing is made. In the current state of the art, about three to five seconds of voice recordings are obtained before a voice print of the user is considered reliable, although this time period may change as voice printing mechanisms evolve.

Figure 10:
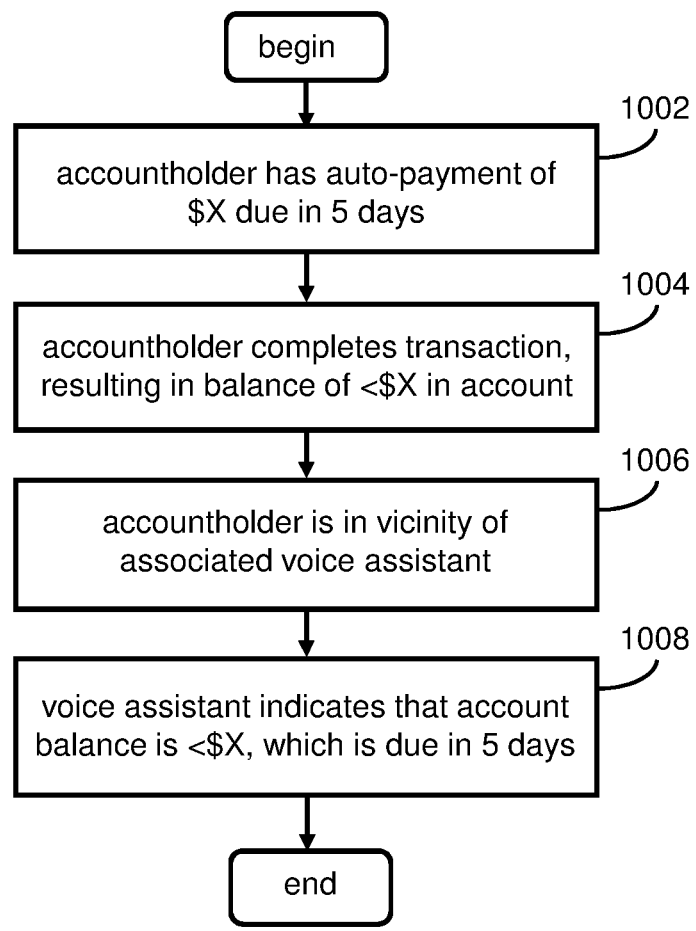
FIG. 10 is a flow diagram showing an example of a useful interaction between the bank and the accountholder, according to some embodiments.

The alert through voice assistant 100 is useful for other interactions between the bank and accountholder. FIG. 10 is a flow diagram showing an example of a useful interaction between the bank and the accountholder, according to some embodiments. The accountholder has set up an auto-payment of the mortgage, which is due in five days (block 1002). The accountholder completes a transaction, such as using a debit card to purchase some clothing, resulting in the account being below the payment due amount (block 1004). Once the accountholder is in the vicinity of the voice assistant (block 1006), the voice assistant vocally recites the low balance and reminds the accountholder of the due date (block 1008).

The alert through voice assistant 100 may provide a wealth of information about the accountholder's account, in some embodiments. The accountholder may set up the voice assistant to provide periodic notifications, as described above. Thus, upon returning home, the voice assistant may inform the accountholder of all daily transactions on the account, the last five transactions of the account, the account balance, the availability of a cash offer, the date of expiration of a cash offer, and so on.

The alert through voice assistant 100 is an enhancement to the multi-channel experience provided by the bank, in some embodiments. For the simplest interaction, the decisioning service-supported back and forth dialogue is sufficient. But if the accountholder has concerns or requests additional details, the alert through voice assistant is able to update the web application (one channel) and customize the landing page of the mobile app (a second channel) to seamlessly provide the customer with more information about the transaction of concern.

Currently bank practices use two-way alerts via text or email that are used to ask customers questions like, "did you make this purchase XYZ at the following merchant?" If the customer says, "yes", further action is avoided, but if the customer says, "no", the bank typically opens a fraud case and restricts the account. By asking the customer for additional information, the alert through voice assistant 100 lowers false positives in the fraud detection flow.

Electronic mail two-way alerts provide less assurance than voice assistants, because fraudsters can take over a customer's emails, often without the customer knowing. The bank ends up mis-reading the level of trust in the customer activity being observed, allowing the fraudster to cause more damage. SMS messages, also known as text messages, are more secure, but there are more scalable vulnerabilities (man-in-the-middle type of attacks) emerging, and it won't be long before they can be as easily cracked as electronic mail. Additionally, banks cannot automatically use SMS messages with every customer, due to TCPA rules. The two-way alert does not enable end-to-end resolution for the customer as well as the alert through voice assistant 100, in some embodiments.

The alert through voice assistant 100 considers where the marketplace is going. Voice assistants are quite popular and at some point, customers may be comfortable handing many transactions using them, including those with a bank. From the bank's perspective, trust in the interaction is higher than with other channels of communication, in that both voice printing and device printing are achieved. Finally, the opportunity to interact "live" and clarify questions or points of confusion with the customer are enhanced using the alert through voice assistant 100.

Figure 11:
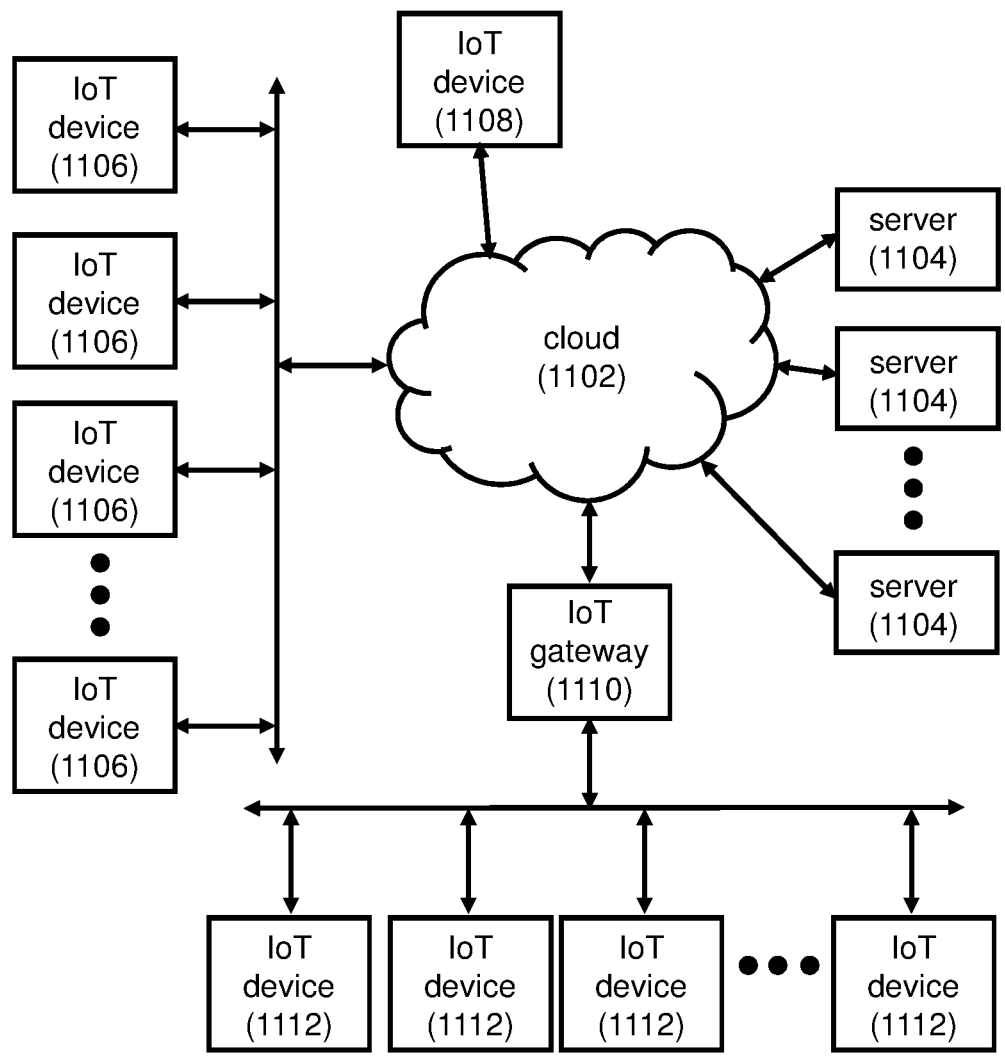
FIG. 11 is a block diagram of an Internet of Things network in which the alert through voice assistant of FIG. 1 may operate, according to some embodiments.

In addition to being able to be an Internet search engine, the voice assistant 120 described herein may operate as an IoT hub. FIG. 11 is a simplified illustration of an Internet of Things (IoT) network 1100, according to some embodiments in which the alert through voice assistant 100 of FIG. 1 may operate. The IoT network 1100 includes a cloud 1102, one or more servers 1104, one or more IoT devices 1106 that connect to the cloud, and one or more IoT devices 1112 that connect to the cloud through an IoT gateway 1110. The cloud 1102 may be the Internet, a local area network (LAN), a wide-area network (WAN), a wireless LAN (WLAN), a wireless WAN (WWAN), a proprietary network, and so on. The IoT devices 1112 interface with the cloud 1102 via the IoT gateway 1110. Cloud computing utilizes remote, networked computing resources to process, manage, and store data. These cloud resources enable IoT devices to interact with powerful back-end analytic and control capabilities.

The voice assistant 120 may be one of the IoT devices 1106 and 1112, which include sensors and actuators that may be controlled by one of the servers 1104, such as the server 108 (FIG. 1). The IoT devices may include alarm systems, parking meters, traffic control lights, and so on. The IoT devices 1106 and 1112, communicating through the cloud 1102, may also communicate with one another, with the one or more servers 1104, and/or with the IoT gateway 1110, as appropriate.

The IoT device 1106 and 1112 may include a network interface controller (NIC) for communication through an Ethernet interface, whether with the IoT gateway 1110, with one or more of the servers 1104, or with other IoT devices. The IoT devices may be part of an ad-hoc or mesh network in which different IoT devices communicate directly with one other. In one example, the mesh network communicates with the cloud 1102 through the IoT gateway 1110. There are protocols, such as Better Approach to Mobile Ad-hoc Networking (BATMAN) or optimized link state routing (OLSR), to enable this direct communication between IoT devices, although these are non-limiting examples.

Figure 12:
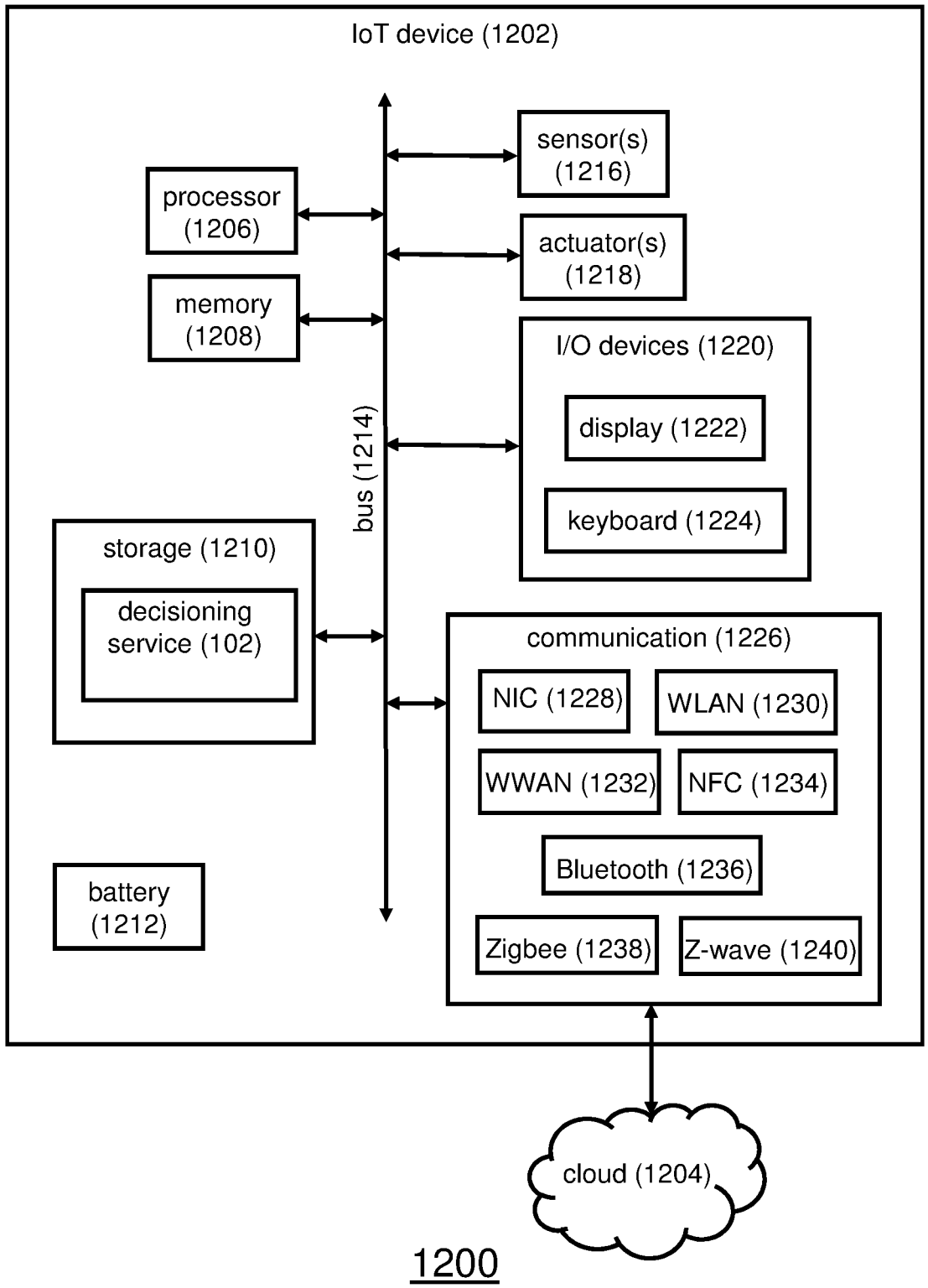
FIG. 12 is a block diagram of an IoT system from which the alert through voice assistant of FIG. 1 may be initiated, according to some embodiments.

FIG. 12 is a simplified block diagram of a system 1200 in which the alert through voice assistant 100 of FIG. 1 may operate, according to some embodiments. The IoT device 1202 includes a processor 1206, a memory 1208, storage 1210, communication means to interface with the cloud 1204, such as a network interface card (NIC) 1228, a WWAN 1232, a WLAN 1230, a Bluetooth 1236, a Zigbee 1238, and/or a Z-wave 1240, for wireless or wired connection to the cloud. As examples, the IoT device 1202 may communicate with the cloud 1204 using Bluetooth, Near Field Communication (NFC), Wireless Fidelity (WiFi), and so on. Because IoT devices are often free-standing in-the-field devices, they may be powered by a battery 1212.

The memory 1206 is not a propagating signal divorced from the underlying hardware of the IoT device 1202 and is thus non-transitory. The components of the IoT device 1202 are connected by a bus 1214. The processor 1206, memory 1208, and storage 1210 may be any of a number of different types known to system design engineers. The IoT device 1202 may further include I/O devices 1220 such as a display 1222 or keyboard 1224.

The bus 1214 may couple the processor 1206 to devices, such as sensors 1216 and actuators 1218, which may be internal or external. The sensors 1216 may include but are not limited to those that monitor temperature, flow, seismic activity, pressure, motion, speed, and may also include camera sensors, traffic sensors, and so on. The actuators 1218 may include but are not limited to lights, alarms, cameras, and so on.

The decisioning service 102 of the alert through voice assistant 100 may be stored in the non-volatile storage 1210, and may be loaded into the memory 1208, to be then executed by the processor 1206.

The IoT device 1202 may be any of a variety of monitoring or actuating devices, including, but not limited to, a camera, an alarm device, a hand-held device, such as a smart phone, a smart television, a seismic sensor, a weather sensor, and so on.

The IoT device 1202 may include any combinations of the components. The components may be implemented as integrated circuits, discrete electronic devices, hardware, software, firmware, or a combination of these. The IoT device 1202 may also be incorporated into a larger system. Those skilled in the art will appreciate that the components illustrated in FIGS. 1-12 described above may be altered in a variety of ways. The order of the logic may be rearranged, some steps may be performed in parallel, illustrated logic may be omitted, other logic may be included, and so on.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An apparatus, comprising:
 a processor; and
 memory coupled to the processor, the memory comprising instructions that when executed by the processor cause the processor to:
  receive, by a voice assistant, a text alert from a decisioning service on a cloud server associated with a financial institution system;
  using a text-to-speech engine, convert, by the voice assistant, the text alert to a voice alert;
  through a speaker of the voice assistant, verbally issue the voice alert by the voice assistant, the voice alert being related to an account of a user with the financial institution system;

identify an answer comprising a voiceprint received via a microphone of the voice assistant;

authenticate the voiceprint by the decisioning service using an audio file database of the cloud server; and analyze behavioral and historical patterns of interaction by the user with the financial institution system, the analysis comprising:

identifying a first Internet Protocol (IP) address of the voice assistant;

identifying a second IP address of a computer or mobile device used by the user during web-based interaction with the financial institution system; and confirming that the first IP address is identical to the second IP address; and take an action related to the account based on the answer, the authentication of the voiceprint, and the analysis of the behavioral and historical patterns of the user's interaction with the financial institution system.

2. The apparatus of claim 1, the decisioning service further comprising an authentication service comprising voice biometrics to confirm the voiceprint as belonging to the user.

3. The apparatus of claim 2, wherein the behavioral and historical pattern analysis of interaction by the user with the financial institution system further comprises:

identifying a first geolocation of the computer or the mobile device used by the user during the web-based interaction with the financial institution system;

identifying a second geolocation of the voice assistant; and confirming that the first geolocation is identical to the second geolocation.

4. The apparatus of claim 1, the decisioning service further comprising a messaging service comprising a natural language processor to interpret the answer and determine a next communication using the voice assistant, if any.

5. The apparatus of claim 4, the messaging service further comprising a chatbot, wherein the next communication is issued by the chatbot using the voice assistant.

6. The apparatus of claim 2, wherein the audio file database comprises a plurality of voiceprints of the user, wherein the voiceprint is added to the audio file database.

7. The apparatus of claim 1, further comprising a voice assistant function to enable the voice assistant to automatically prompt the user of the voice alert.

8. The apparatus of claim 7, wherein the voice alert is selected from a group consisting of a fraud, a payment due, an overdraft, a make payment option, an auto-payment setup option, a last five transactions notice, a today's transactions notice, a card upgrade option, and a cash offer.

9. The apparatus of claim 1, further causing the processor to instruct the user to access a landing page of a customized application on the computer or mobile device for further information about the voice alert, wherein the customized application is controlled by the decisioning service on the cloud server.

10. At least one machine-readable storage medium comprising instructions that, when executed by a processor, cause the processor to:

receive, by a voice assistant, a text alert from software running on a cloud server associated with a financial institution system;

using a text-to-speech engine, convert, by the voice assistant, the text alert to a voice alert;

through a speaker of the voice assistant, verbally issue the voice alert by the voice assistant, wherein the voice assistant is associated with a user and the voice alert is related to an account of the user with the financial institution system;

identify an answer comprising a voiceprint via a microphone of the voice assistant;

authenticate the voiceprint using an audio file database of the cloud server;

analyze behavioral and historical patterns of interaction by the user with the financial institution system, the analysis comprising:

identifying a first Internet Protocol (IP) address of the voice assistant;

identifying a second IP address of a computer or mobile device used by the user during web-based interaction with the financial institution system; and confirming that the first IP address is identical to the second IP address; and take an action related to the account based on the answer, the authentication of the voiceprint, and the analysis of the behavioral and historical patterns of the user's interaction with the financial institution system, the action comprising:

converting the voiceprint to text;

interpreting the text; and responding to the user using the voice assistant.

11. The at least one machine-readable storage medium of claim 10, comprising instructions that, when executed by the processor, further cause the processor to authenticate the voiceprint using voice biometrics.

12. The at least one machine-readable storage medium of claim 10, comprising instructions that, when executed by the processor, further cause the processor to utilize the behavioral and historical patterns of the user to authenticate the user without using the voiceprint.

13. The at least one machine-readable storage medium of claim 10, comprising instructions that, when executed by the processor, further cause the processor to:

use a natural language processor to analyze the text and determine a next communication with the user; and use a chatbot to convey the next communication to the user using the voice assistant.

14. The at least one machine-readable storage medium of claim 10, comprising instructions that, when executed by the processor, further cause the processor to instruct the user, via the voice assistant, to access a channel of communication for further information, wherein the channel of communication is selected from a group consisting of:

a physical address of the financial institution system where the account is held;

a telephone number of the financial institution system;

an electronic mail address of the financial institution system;

a web page of the financial institution system; and an app of the financial institution system on the mobile device, wherein the mobile device is owned by the user.

15. The at least one machine-readable storage medium of claim 10, comprising instructions that, when executed by the processor, further cause the processor to:

determine that the voiceprint is authenticated;

receive confirmation from the user that the voice alert is unknown to the user, wherein the voice alert is a fraud alert; and block access to the account of the user.

16. An apparatus, comprising:
a processor; and
a memory coupled to the processor, the memory comprising instructions to be executed by the processor, the instructions further comprising:
- a messaging service to send messages to and receive messages from a user, the messaging service to be controlled by a cloud server associated with a financial institution system, the messages to be conveyed by a voice assistant, the messaging service to further:
  - generate a text alert related to an account of the user at the financial institution system;
  - convert the text alert to a voice alert;
  - verbally issue the voice alert to the user using the voice assistant, wherein the voice assistant is associated with the user;
  - via a microphone of the voice assistant, receive an answer comprising a voiceprint; and
  - take an action related to the account based on the answer received, authentication of the voiceprint, and analysis of behavioral and historical patterns of interaction by the user with the financial institution system, the analysis comprising:
    - identifying a first Internet Protocol (IP) address of the voice assistant;
    - identifying a second IP address of a computer or mobile device used by the user during web-based interaction with the financial institution system; and
    - confirming that the first IP address is identical to the second IP address; and
- an authentication service to authenticate the voiceprint and analyze the behavioral and historical patterns of interaction by the user with the financial institution system.

17. The apparatus of claim 16, the authentication service further comprising:
- voice biometrics to confirm the voiceprint as belonging to the user; and
- behavioral and historical patterns of the user to supplement the voiceprint in authenticating the user.

18. The apparatus of claim 16, the messaging service further comprising a natural language processor to interpret the answer of the user and determine a next communication with the user using the voice assistant, if any.

19. The apparatus of claim 16, wherein the authentication service further comprises an audio file database comprising a plurality of voiceprints of the user, and the voiceprint is added to the audio file database.

* * * * *